United States Patent
Flick et al.

(10) Patent No.: US 9,876,864 B2
(45) Date of Patent: Jan. 23, 2018

(54) SERVICE DISCOVERY MANAGEMENT

(71) Applicant: Hewlett Packard Enterprise Development LP, Houston, TX (US)

(72) Inventors: John W Flick, Roseville, CA (US); Ashwin Bhalchandra Hegde, Sunnyvale, CA (US); James P Hickey, Roseville, CA (US); Jorge Arturo Sauma Vargas, San Jose (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/108,408

(22) PCT Filed: Jan. 8, 2014

(86) PCT No.: PCT/US2014/010645

§ 371 (c)(1),
(2) Date: Jun. 27, 2016

(87) PCT Pub. No.: WO2015/105483

PCT Pub. Date: Jul. 16, 2015

(65) Prior Publication Data

US 2016/0344823 A1 Nov. 24, 2016

(51) Int. Cl.
*H04L 29/08* (2006.01)
*H04W 48/16* (2009.01)
(Continued)

(52) U.S. Cl.
CPC ............. *H04L 67/16* (2013.01); *H04W 48/16* (2013.01); *H04W 88/08* (2013.01); *H04W 92/10* (2013.01); *H04W 92/14* (2013.01)

(58) Field of Classification Search
CPC ..... H04W 12/06; H04W 48/16; H04W 88/08; H04W 92/14; H04W 92/10; H04W 8/005;
(Continued)

(56) References Cited

U.S. PATENT DOCUMENTS 8,060,590 B2 11/2011 Ebbert
8,180,891 B1 5/2012 Harrison
(Continued)

OTHER PUBLICATIONS

Aruba Networks, Inc., An Aruba Group Solution Guide: Airplay and Airprint on Campus Networks, 2012, 9 Pgs.
(Continued)

*Primary Examiner* — Nizar Sivji
(74) *Attorney, Agent, or Firm* — Hewlett Packard Enterprise Patent Department (57) ABSTRACT

In one implementation, an access point includes a wireless communications interface, a service discovery module in communication with the wireless communications interface, and a forwarding module. The service discovery module is to receive a service discovery message, to identify a service discovery announcement within the service discovery message, and to determine whether the service discovery announcement is allowed by a service filter. The forwarding module is to forward a portion of the service discovery message including the service discovery announcement if the service discovery announcement is allowed by the service filter and to drop the portion of the service discovery message including the service discovery announcement if the service discovery announcement is not allowed by the service filter.

19 Claims, 7 Drawing Sheets (51) Int. Cl.
H04W 88/08 (2009.01)
H04W 92/10 (2009.01)
H04W 92/14 (2009.01)

(58) Field of Classification Search
CPC ..... H04W 88/04; H04W 48/14; H04W 48/20; H04W 92/02; H04L 67/16; H04L 63/0227; H04L 63/0263
See application file for complete search history.

(56) References Cited

U.S. PATENT DOCUMENTS

| | | |
|---|---|---|
| 2004/0003058 A1 | 1/2004 | Trossen |
| 2005/0059396 A1 | 3/2005 | Chuah et al. |
| 2009/0077217 A1 | 3/2009 | McFarland et al. |
| 2010/0325248 A1 | 12/2010 | Gonzalez |
| 2015/0142919 A1* | 5/2015 | Lee ................... H04L 67/2814 709/219 |
| 2015/0156630 A1* | 6/2015 | Ankaiah ............... H04L 63/101 726/4 |

OTHER PUBLICATIONS

Bhandari, S. et al., Extending Multicast DNS Accross Local Links in Campus and Enterprise Networks, pp. 1-12, Jul. 15, 2013.
Cisco Systems, Inc., Bonjour Gateway Wireless LAN Controller Deployment Guide, Release 7.5, pp. 1-24, Aug. 2013.
International Searching Authority, The International Search Report and the Written Opinion, Oct. 1, 2014, 10 Pgs.
SmartWay Beyond Bonjour Bridging, Jan. 2013, 2 Pgs.
Xirrus, Inc., Bonjour Director, pp. 1-5, Dec. 5, 2012.

* cited by examiner

SERVICE DISCOVERY MANAGEMENT

BACKGROUND

Multicast Domain Name System (also referred to as multicast DNS or mDNS) and DNS-Based Service Discovery (also referred to as DNS-SD) can be used by computing systems to provide service discovery such as zero-configuration networking (also referred to as zeroconf). For example, physical and virtual computing systems hosting mDNS and DNS-SD modules can query and advertise services (i.e., functionalities, data, or combinations thereof) provided by those computing systems to other computing systems in a distributed manner without prior coordination. Such service discovery methodologies can simplify discovery of services such as printing services; file storing or sharing services; remote desktop services; application services; multimedia services such as audio streaming services or video streaming services; textual, audio, and/or video communications services within a network.

Typically, computing systems that support mDNS and DNS-SD issue multicast service queries and observe multicast service advertisements (also referred to as service responses) to determine which services are available within a network. Because such service queries and service advertisements are communicated using multicast communications (i.e., multicast communications or communications that emulate multicast communications), multiple computing systems (or services hosted at those computing systems) can respond to a single service query and multiple computing systems can receive a single service advertisement. Thus, information about services available within a network of computing systems can propagate quickly through the network.

DETAILED DESCRIPTION

Although mDNS and DNS-SD can support propagation of information about services available within a network of computing systems (also referred to simply as a network) to simplify service discovery (i.e., identification of available or accessible services), such service discovery can have a negative effect on aspects of networks. As an example, service discovery can result in additional traffic (e.g., communication) within a network because many computing systems can query and/or advertise services via the network. As a specific example, many consumer computing systems host and advertise services for service discovery. As such, networks to which many consumer computing systems conned such as networks on college campuses, in hotels, in public places, and at businesses that allow employees to connect their personal computing systems to business networks can have many computing devices advertising services. Moreover, service discovery can simplify advertisement and/or identification of services that are not approved or allowed within the network.

Traditional approaches to managing service discovery within networks rely on identification of the computing systems hosting (or providing) services. For example, a computing system hosting a service can be registered with a central controller within a network as a type or class of system, as associated with a particular user, or as associated with a group or class of users and a corresponding set of permissions can be applied to that computing system for advertising services. Subsequently, service discovery messages from that computing system can be forwarded or dropped within the network as directed by the central controller based on those permissions. In some implementations, all service discovery messages from computing systems that are not registered with a controller are dropped.

Furthermore, a computing system can be registered with the central controller within the network as a type or class of system, as associated with a particular user, or as associated with a group or class of users and a corresponding set of permissions can be applied to that computing system for receiving service discovery messages. Subsequently, service discovery messages can be forwarded to or dropped (i.e., not forwarded) with respect to that computing system within the network as directed by the central controller based on those permissions.

Such approaches can be useful to environments in which computing systems each host only a single service. However, such approaches fail to allow service-level management of service discovery within environments in which computing systems may each host multiple services. Moreover, because such approaches rely on a central controller, most if not all service discovery messages are routed to the central controller for a determination of what action (e.g., forward or drop) should be applied to each service discovery message. Such forwarding can degrade network performance (e.g., cause network congestion) as many service discovery messages are routed to the controller.

This disclosure describes service discovery management methodologies and systems that enhance communication efficiency within networks and allow service-level management of service discovery messages. For example, service discovery management methodologies discussed herein can be applied at an access point to extract service discovery announcements from service discovery messages at ingress to or egress from a network. Such implementations can reduce the amount of traffic within a network and allow for per-client per-user, per-access point, and/or per-network management of service discovery announcements.

Figure 1:
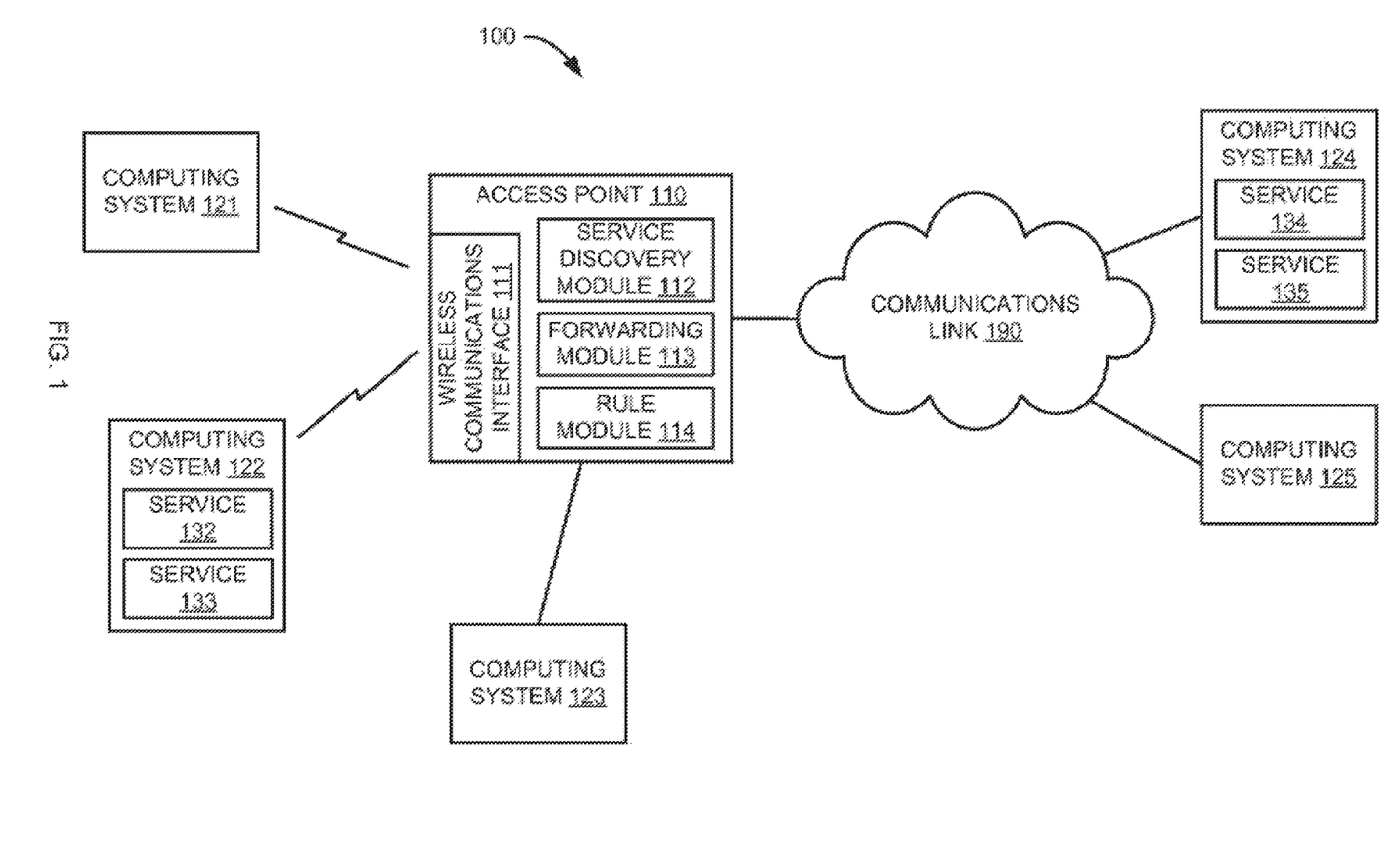
FIG. 1 is an illustration of an environment including an access point including a service discovery management system, according to an implementation.

FIG. 1 is an illustration of an environment including an access point including a service discovery management system, according to an implementation. Environment 100 includes access point 110, computing systems 121-125, and communications link 190. Computing systems 121-125 can be physical computing systems or virtual computing systems connected to (or associated with) the network.

Computing systems 122 and 124 host services 132 and 133 and 134 and 135, respectively. In other words, services 132 and 133 and 134 and 135 are available or accessible at computing systems 122 and 124, respectively. As examples, services 132-135 can each be a service such as a printing service; a file storing or sharing service; a remote desktop service; an application service; a data or information service; a multimedia service such as an audio streaming service or a video streaming service; a textual, audio, and/or video communications service; or some other service. Accordingly, computing systems 122 and 124 can each be any system or device that hosts such a service. For example, a computing system can be a server, a desktop computer, a notebook computer, a tablet, a smartphone, a printer, a computing appliance, or some other computing system. Moreover, computing systems 121-125 can be physical computing systems or virtualized (or virtual) computing systems connected to (or associated with) the network. Collectively, access point 110 and communications link 190 can be referred to as a network. Computing systems 121-125 and services 132-135 can be referred to as clients of that network. Clients of a network are computing systems, services, and/or applications that communicate via that network.

Access point 110 is a network device (e.g., a computing system within a network such as a switch) via which clients of a network can connect to the network to communicate with other clients of the network. In the example illustrated in FIG. 1, access point 110 includes wireless communications interface 111. Thus, wireless clients of the network can connect to the network to communicate with other clients of the network via wireless communications interface 111. In other words, wireless clients of a network are coupled wirelessly (or associated) to a network via an access point. Wireless clients of a network are clients of that network (e.g., physical or virtual computing systems that communicate via the network) that are wirelessly coupled with an access point of that network. A wireless client of a network is said to be associated with the access point via which it is communicatively coupled to the network and other clients of the network.

Additionally, access point 110 includes a wired communications interface (not shown). Accordingly, wired clients of the network can connect to the network to communicate with other clients of the network via the wired communications interface. Wired clients of a network are clients of that network (e.g., physical or virtual computing systems that communicate via the network) that are coupled with an access point of that network via a cable such as an electrically conductive cable or a fiber optic cable. In other implementations, an access point can have only wireless clients or only wired client.

Computing systems 121 and 122 are clients of the network. Computing systems 121 and 122 are wireless clients of the network that are associated with access point 110 and can communicate with other clients and network devices of the network via access point 110. In other words, computing systems 121 and 122 each include (or access) a wireless communications interface (not shown) to establish a wireless communications link (e.g., radio-frequency link, free-space optical link, or sonic link) with wireless communications interface 111 of access point 110. Computing system 123 is a wired client of the network. That is, computing system 123 includes a wired communications interface (not shown) to communicate with computing systems 121 and 122 and/or other clients of the network (e.g., computing systems 124 and 125 and/or other computing systems in communication with communications link 190).

Communications link 190 includes devices, systems, services, or combinations thereof that define communications paths between access point 110. computing devices 124 and 125, services 134 and 135, and/or other devices or services. For example, communications link 190 can include one or more of a cable (e.g., twisted-pair cable, coaxial cable, or fiber optic cable), a wireless communications link, or any other connectors or systems that transmit or support transmission of signals. Moreover, communications link 190 can include communications networks such as a switch fabric, an intranet, the Internet, telecommunications networks, or a combination thereof. Additionally, communications link 190 can include proxies, routers, switches, gateways, bridges, load balancers, and similar communications devices. Furthermore, the connections or communications paths illustrated in FIG. 1 and discussed herein can be logical or physical. Thus, for example, computing system 125 may not be physically connected to communications link 190, but may be accessible via communications link 190 and a server and/or additional communications links.

Computing systems 122 and 124 provide service discovery messages (not shown in FIG. 1) including service discovery announcements to advertise or describe the availability of services 132-135 via the network including access point 110 and communications link 190. More specifically, for example, computing system 122 can provide service advertisements associated with services 132 and 133 and computing system 124 can provide service advertisements associated with services 134 and 135. In some implementations, service discovery messages are transmitted as multicast communications. For example, service discovery messages can be transmitted as DNS messages according to an mDNS protocol. That is, such service discovery messages can be transmitted using multicast communications and DNS formats and/or protocols.

Figure 2:
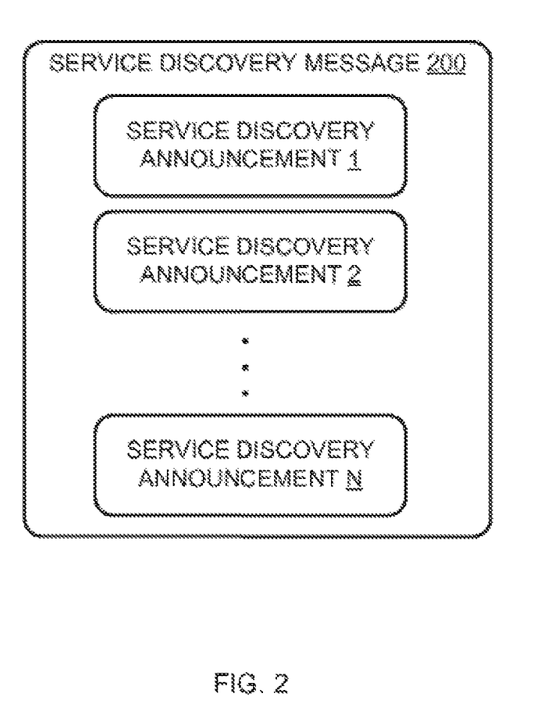
FIG. 2 is a schematic representation of a service discovery message including multiple service discovery announcements, according to an implementation.

FIG. 2 is a schematic representation of a service discovery message including multiple service discovery announcements, according to an implementation. Service discovery message 200 is a data set that includes one or more service discovery announcements (i.e., service discovery announcements 1-N in FIG. 2). Service discovery announcements 1-N are data sets within a service discovery message that describe a query for or advertisement of a services. In other words, service discovery announcements 1-N are service queries (or service requests) and/or service advertisements. Additionally, service discovery message 200 can include additional information such as a header (not shown) including information describing service discovery message 200 and/or service discovery announcements 1-N.

As a specific example, service discovery message 200 can be a Dynamic Name Service (DNS) message. Moreover, service discovery message 200 can include one or more DNS records such as entries in a question section of the DNS message, resource records in an answer section of the DNS message, name server resource records in an authority section of the DNS message, and/or resource records in an additional records section of the DNS message. In other words, service discovery announcements 1-N can be entries in a question section of a DNS message, resource records in an answer section of a DNS message, name server resource records in an authority section of a DNS message, and/or resource records in an additional records section of a DNS message.

Referring to FIG. 1, computing systems 121-125 can provide service discovery messages (not shown in FIG. 1) including service discovery announcements to query or request information about the availability of services via the network including access point 110 and communications link 190. As a specific example, computing systems 121-125 can provide service queries (or service requests) for services. In response to such service discovery messages, computing systems 122 and 124, and/or other computing systems, can provide service discovery messages (not shown in FIG. 1) including service discovery announcements to advertise or describe the availability of services corresponding to or matching services queried.

Access point 110 receives service discovery messages, drops portions of such service discovery messages that are not allowed by one or more service filters, and forwards portions of such service discovery messages that are allowed by one or more service filters. In the implementation illustrated in FIG. 1, access point 110 includes service discovery module 112, forwarding module 113, and rule module 114.

Although particular modules (i.e., combinations of hardware and software) are illustrated and discussed in relation to FIG. 1 and other example implementations, other combinations or sub-combinations of modules can be included within other implementations. Said differently, although modules illustrated in FIG. 1 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. Moreover, a module discussed herein in relation to a particular type of module can be implemented as a different type of module in other implementations.

Rule module 114 accesses service filters that are applied to service discovery announcements within service discovery messages to determine whether a service discovery announcement is allowed by one or more service filters. For example, rule module 114 can access service filters at a service filter repository (not shown) during an initialization process of access point 110, in response to association of a wireless client with access point 110, in response to receipt of a service discovery message, or in response to some other stimulus and store those service filters at a memory of access point 110 (not shown).

A service filter defines one or more rules (or conditions) that can be satisfied by a service discovery announcement. For example, a rule can be satisfied if a type, a class, or some other field or property of a service discovery announcement matches or substantially matches a data set of the rule. As another example, a rule can be satisfied if a type, a class, or some other field or property of a service discovery announcement does not match or does not substantially match a data set of the rule. In some implementations, a service discovery announcement can satisfy multiple service filters (or rules of service filters). In some such implementations, an order such as a priority order can be established among the service filters, and the first service filter satisfied by a service discovery announcement is applied to the service discovery announcement. In other such implementations, a priority can be established among the service filters, and the service filter with the highest priority of the service filters satisfied by a service discovery announcement is applied to the service discovery announcement. In yet other such implementations, each service filter satisfied by a service discovery announcement is applied to that service discovery announcement.

Service discovery module 112 receives service discovery messages, identifies service discovery announcements within service discovery message, and determines whether service discovery announcements are allowed by service filters. For example, service discovery module 112 can parse service discovery messages to identify service discovery announcements within those service discovery messages. Service discovery module 112 can then compare fields or properties of service discovery announcements with service filters to determine whether those service discovery announcements are allowed by those service filters. In some implementations, a service discovery announcement can be allowed by a service filter if the service filter is satisfied by the service discovery announcement. In some implementations, a service discovery announcement can be allowed by a service filter if the service filter is not satisfied by the service discovery announcement.

Forwarding module 113 drops service discovery announcements that are not allowed by a service filter and forwards service discovery announcements that are allowed by a service filter. A service discovery announcement can be forwarded by including that service discovery announcement in a service discovery message that is transmitted via a communications interface, via a virtual network link (e.g., virtual local area network (VLAN)), or to a client of access point 110.

A service discovery announcement can be dropped by extracting (or excluding) that service discovery announcement from a service discovery message (or a portion of that service discovery message including that service discovery announcement). For example, forwarding module 113 can extract service discovery announcements from a service discovery message by generating a copy of a service discovery message that does not include those service discovery announcements, but does include other service discovery announcements included in the original service discovery message. As another example, forwarding module 113 can extract service discovery announcements from a service discovery message by modifying that service discovery message (e.g., within a memory of access point 110) to not include those service discovery announcements.

Moreover, in some implementations, forwarding module 113 can drop different service discovery announcements from a service discovery message relative to different communications interfaces, virtual network links (e.g., VLANs), or clients of access point 110. In other words, for example, one set of service discovery announcements can be extracted from a service discovery message before that service discovery message is forwarded via one communications interface or to one client, and a different set of service discovery announcements can be extracted from that service discovery message before that service discovery message is forwarded via another communications interface or to another client.

Figure 3:
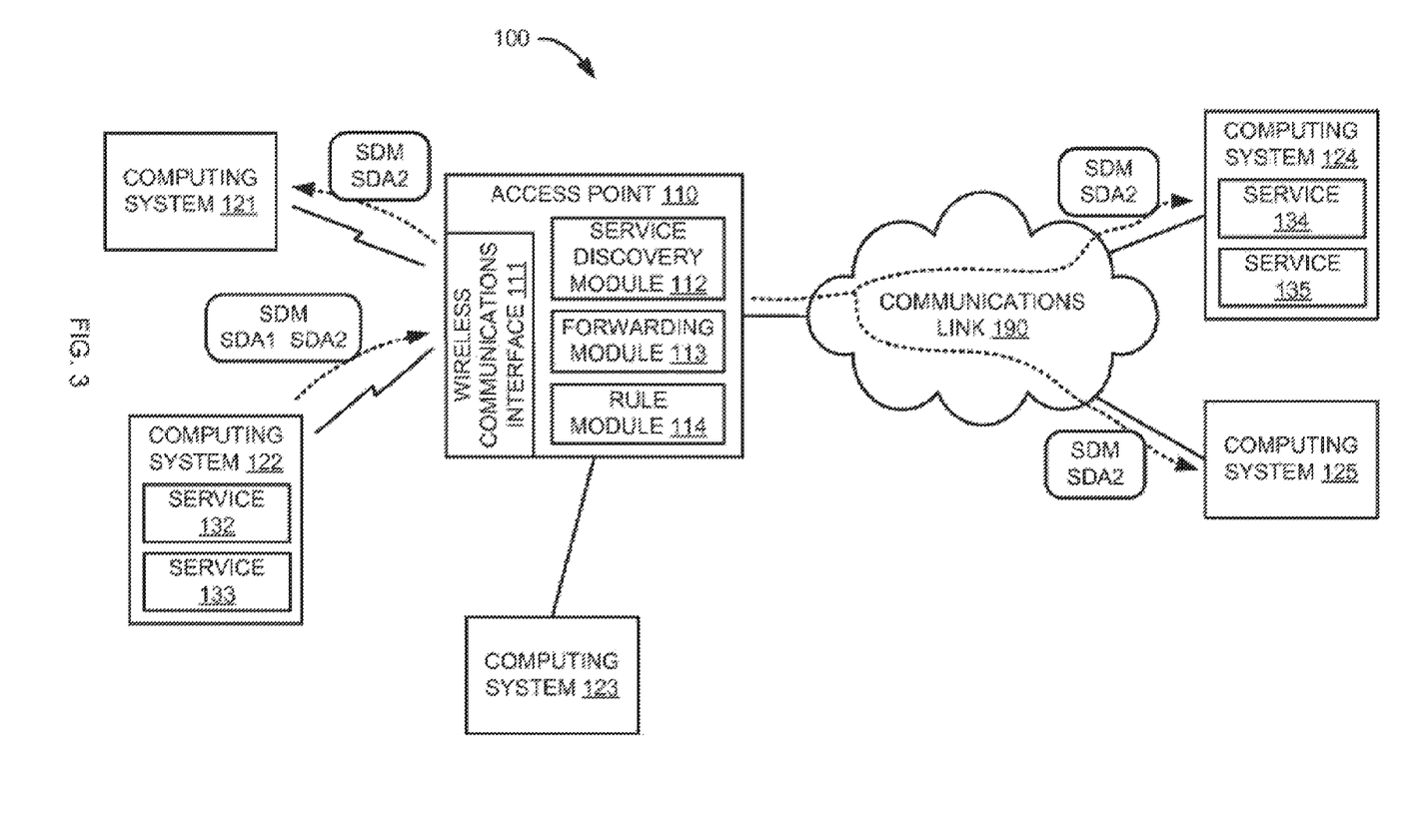
FIG. 3 is an illustration of a service discovery message within the environment illustrated in FIG. 1, according to an implementation.

FIG. 3 is an illustration of a service discovery message within the environment illustrated in FIG. 1, according to an implementation. As illustrated in FIG. 3, computing system 122 transmits a service discovery message (labeled "SDM" in FIG. 3) to advertise services 132 and 133 hosted at computing system 122. In this example, the service discovery message transmitted from computing system 122 includes a service discovery announcement advertising service 132 (labeled "SDA1" in FIG. 3) and a service discovery announcement advertising service 133 (labeled "SDA2" in FIG. 3). For example, service 132 can be an audio streaming service (e.g., a service that receives audio data from clients and outputs corresponding audible signals or a service that transmits audio data to clients) and service 133 can be a file sharing service.

Service discovery message SDM is received at service discovery module 112 via wireless communications interface 111. Service discovery module 112 then identifies service discovery announcement SDA1 and service discovery announcement SDA2 within service discovery message SDM. Service discovery module 112 then identifies a service filter for service discovery announcement SDA1 and service discovery announcement SDA2. For example, service discovery module 112 can select a service filter previously accessed by rule module 114 for each of service discovery announcement SDA1 and service discovery announcement SDA2 corresponding to an identifier of computing system 122 or another computing system, an identity of a user of computing system 122 or another computing system, a type or class of service 132 and/or service 133, or using some other methodology.

In the example illustrated in FIG. 3, service discovery module 112 selects a service filter corresponding to computing system 122 for each of service discovery announcement SDA1 and service discovery announcement SDA2. Service discovery announcement SDA1 is not allowed by the selected service filter and service discovery announcement SDA2 is allowed by the selected service filter. Accordingly, forwarding module 113 drops service discovery announcement SDA1 (or a portion of service discovery message SDM including service discovery announcement SDA1). For example, forwarding module 113 can extract service discovery announcement SDA1 from service discovery message SDM by generating a copy of service discovery message SDM that does not include service discovery announcement SDA1 and does include service discovery announcement SDA2. As another example, forwarding module 113 can extract service discovery announcement SDA1 from service discovery message SDM by deleting a portion of service discovery message SDM including service discovery announcement SDA1. As yet another example, forwarding module 113 can extract service discovery announcement SDA1 from service discovery message SDM by transmitting (or causing transmission) portions of service discovery message SDM not including service discovery announcement SDA1, but not transmitting one or more portions of service discovery message SDM including service discovery announcement SDA1. Additionally, forwarding module 113 can also alter values of service discovery message SDM such as values identifying a size or length of service discovery message SDM or a number of service discovery announcements included within service discovery message SDM.

Forwarding module 113 then forwards service discovery message SDM including service discovery announcement SDA2 (and excluding service discovery announcement SDA1). For example, as illustrated in FIG. 3, forwarding module 113 can forward (e.g., transmit or provide) service discovery message SDM to computing systems 124 and 125 via communications link 100. As a specific example, access point 110 can include a wired communications interface (not shown) to which communication link 190 is operatively coupled, and forwarding module 113 can forward service discovery message SDM via that wired communications interface. Additionally, forwarding module 113 can forward service discovery message SDM to wireless clients of access point 110. In the example illustrated in FIG. 3, access point 110 transmits service discovery message SDN to computing system 121 via wireless communications interface 111.

In some implementations, more than one service filter is selected by service discovery module 112 and applied to a service discovery announcement to determine whether that service discovery announcement is allowed. In some implementations, multiple service filters can be applied to a service discovery announcement with response to multiple computing devices or users thereof, communications interface, networks, network segments, or VLANs, for example.

In the example illustrated in FIG. 3, a service filter corresponding to computing system 123 is selected and applied to service discovery message SDM including service discovery announcement SDA2 before service discovery message SDM is forwarded to computing system 123. Service discovery module 112 applies the service filter corresponding to computing system 123 to service discovery announcement SDA2 (e.g., compares the service filter corresponding to computing system 123 with service discovery announcement SDA2) and determines that service discovery announcement SDA2 is not allowed by that service filter. Accordingly, forwarding module 113 drops service discovery announcement SDA2 with respect to computing system 123. Because service discovery message SDM does not include any service discovery announcements after service discovery announcement SDA2 is dropped, forwarding module 113 does not forward any portions of service discovery message SDM to computing system 123.

Similarly, although not illustrated in FIG. 3, service discovery message SDM transmitted by computing system 122 could also include a service query as a service a service discovery announcement. One or more service filters could then be applied to the service query (a service discovery announcement) at service discovery module 112, and forwarding module 113 could forward or drop that service query based on the one or more service filters. Thus, propagation of service advertisements and service queries can be managed within a network.

Figure 4:
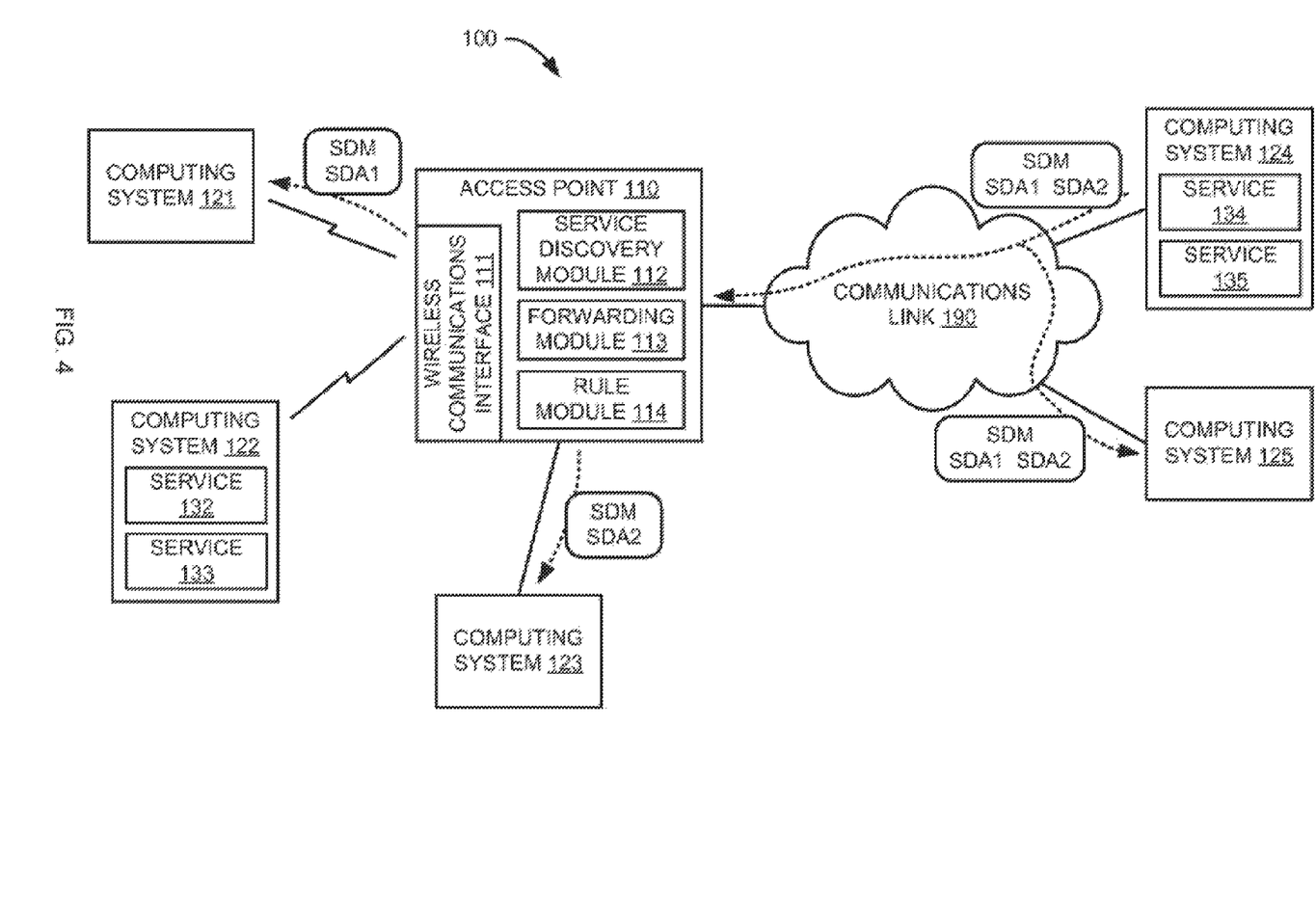
FIG. 4 is another illustration of a service discovery message within the environment illustrated in FIG. 1, according to an implementation.

FIG. 4 is another illustration of a service discovery message within the environment illustrated in FIG. 1, according to an implementation. In the example illustrated in FIG. 4, computing system 124 transmits service discovery message SDM to advertise services 134 and 135. In this example, service discovery message SDM includes service discovery announcement SDA1 corresponding to service 134 and service discovery announcement SDA2 corresponding to service 135. Service discovery message SDM is routed by communications link 190 to computing system 125 end to access point 110. Accordingly, service discovery message SDM including service discovery announcement SDA1 and service discovery announcement SDA2 is received at computing system 125 and at access point 110.

At access point 110, service discovery message SDM including service discovery announcement SDA1 and service discovery announcement SDA2 is provided to service discovery module 112. Service discovery module 112 identifies service discovery announcement SDA1 and service discovery announcement SDA2 within service discovery message SDM and determines whether service discovery announcement SDA1 and service discovery announcement SDA2 are allowed by one or more service filters.

In the example illustrated in FIG. 4, service discovery module 112 applies a service filter to service discovery announcement SDA1 and service discovery announcement SDA2 for each wireless client of access point 110 to determine whether service discovery announcement SDA1 and service discovery announcement SDA2 should be forwarded or dropped with respect to those wireless clients. The service filter corresponding to computing system 121 allows service discovery announcement SDA1 and does not allow service discovery announcement SDA2. The service filter corresponding to computing system 123 allows service discovery announcement SDA2 and does not allow service discovery announcement SDA1. The service filter corresponding to computing system 122 does not allow service discovery announcement SDA1 or service discovery announcement SDA2.

Forwarding module 113 then drops or forwards service discovery announcement SDA1 and service discovery announcement SDA2 within service discovery message SDM (or copies thereof) with respect to each of computing systems 121-123 based on whether service discovery announcement SDA1 and service discovery announcement SDA2 are allowed for that computing system by the corresponding service filter. In other words, forwarding module 113 forwards service discovery announcement SDA1 and service discovery announcement SDA2 within service discovery module SDM to each client depending on whether service discovery announcement SDA1 and service discovery announcement SDA2 are allowed by or for that client.

Specifically, in this example, forwarding module 113 drops service discovery announcement SDA2 with respect to computing device 121 and service discovery message SDM including service discovery announcement SDA1 is forwarded to computing system 121. Additionally, forwarding module 113 drops service discovery announcement SDA1 with respect to computing device 122 and service discovery message SDM including service discovery announcement SDA2 is forwarded to computing system 123. Additionally, forwarding module 113 drops service discovery announcement SDA1 and service discovery announcement SDA2 with respect to computing device 122, and service discovery message SDM is not forwarded to computing system 122 because neither service discovery announcement SDA1 nor service discovery announcement SDA2 is allowed by the service filter corresponding to computing system 122.

Figure 5:
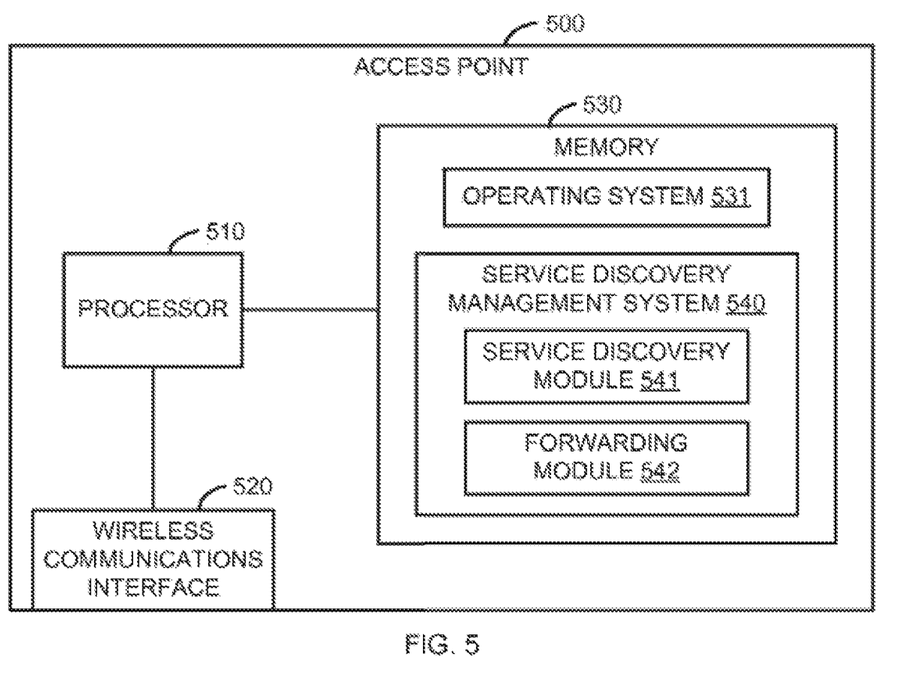
FIG. 5 is a schematic block diagram of an access point hosting a service discovery management system, according to an implementation.

FIG. 5 is a schematic block diagram of an access point hosting a service discovery management system, according to on implementation. As illustrated in FIG. 5, access point 500 includes processor 510, wireless communications interface 520, and memory 530. Processor 510 is any combination of hardware and software that executes or interprets instructions, codes, or signals. For example, processor 510 can be a microprocessor, an application-specific integrated circuit (ASIC), a graphics processing unit (GPU) such as a general-purpose GPU (GPGPU), a distributed processor such as a duster or network of processors or computing systems, a multi-core or multi-processor processor, a virtual or logical processor, or some combination thereof. As a specific example, in some implementations, processor 510 can include multiple processors such as one or more general purpose processors and one or more ASICs.

Wireless communications interface 520 is a module via which processor 510 can communicate with other processors or computing systems via a wireless communications link. As a specific example, communications interface 520 can include a wireless network interface card and a communications protocol stack hosted at processor 510 (e.g., instructions or code stored at memory 530 and executed or interpreted at processor 510 to implement a network protocol) to receive data from and send data to resource authorities. As specific examples, wireless communications interface 520 can be an IEEE 802.11 or Wi-Fi® interface, a Bluetooth® interface, a ZigBee® interface, or some other wireless communications interface via which processor 510 can exchange signals or symbols representing data to communicate with other processors or computing systems. An access point that includes a wireless communications interface can be referred to as a wireless access point.

In some implementations, access point 500 also includes one or more additional communications interfaces (not shown). For example, access point 500 can include one or more wired communications interfaces, such as a twisted-pair Ethernet interface, via which access point 500 can be communicatively coupled to other computing systems or network devices via one or more communication links. Moreover, in some implementations, access point 500 can include instructions within memory 530 that can be executed at processor 510 to implement (or host) one or more modules that bridge or connect two or more communications interfaces of access point 500. In some implementations, access point includes circuitry to bridge or connect two or more communications interfaces of access point 500.

Memory 530 is one or more processor-readable media that store instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 530 can be a volatile random access memory (RAM), a persistent data store such as a hard-disk drive or a solid-state drive, a compact disc (CD), a digital versatile disc (DVD), a Secure Digital™ (SD) card, a MultiMediaCard (MMC) card, a CompactFlash™ (CF) card, or a combination thereof or of other memories. In other words, memory 330 can represent multiple processor-readable media. In some implementations, memory 530 (or some portion thereof) can be integrated with processor 510, separate from processor 510, and/or external to access point 500.

Memory 530 includes instructions or codes that when executed at processor 510 implement operating system 531, service discovery management system 540, and/or other modules. A processor implements a module by performing functionalities, processes, or actions associated with that module. Thus, instructions or codes stored at memory 530 and/or executed (or interpreted) by processor 510 can be referred to as modules. Memory 530 is also operable to store additional codes or instructions to implement other modules not illustrated in FIG. 5 such as a rule module and/or other data sets such as a group of service filters. For example, service discovery management system 540 can include a rule module (not shown in FIG. 5).

Service discovery management system 540 includes service discovery module 541 and forwarding module 542, and can be accessed or installed at access point 500 from a variety of memories or processor-readable media or via a communications network. For example, access point 500 can access service discovery management system 540 at a remote processor-readable medium via a communications interface other than wireless communications interface 520 (not shown). As a specific example, access point 500 can be a network-boot device that accesses operating system 531 and/or service discovery management system 540 during a boot process (or sequence). As yet another example, access point 500 can include (not illustrated in FIG. 5) a processor-readable medium access device (e.g., a CD or DVD drive or a CF or SD card reader) to access a processor-readable medium storing service discovery management system 540.

In some implementations, a computing device such as an access point hosting or implementing a service discovery management system can itself be referred to as a service discovery management system.

Figure 6:
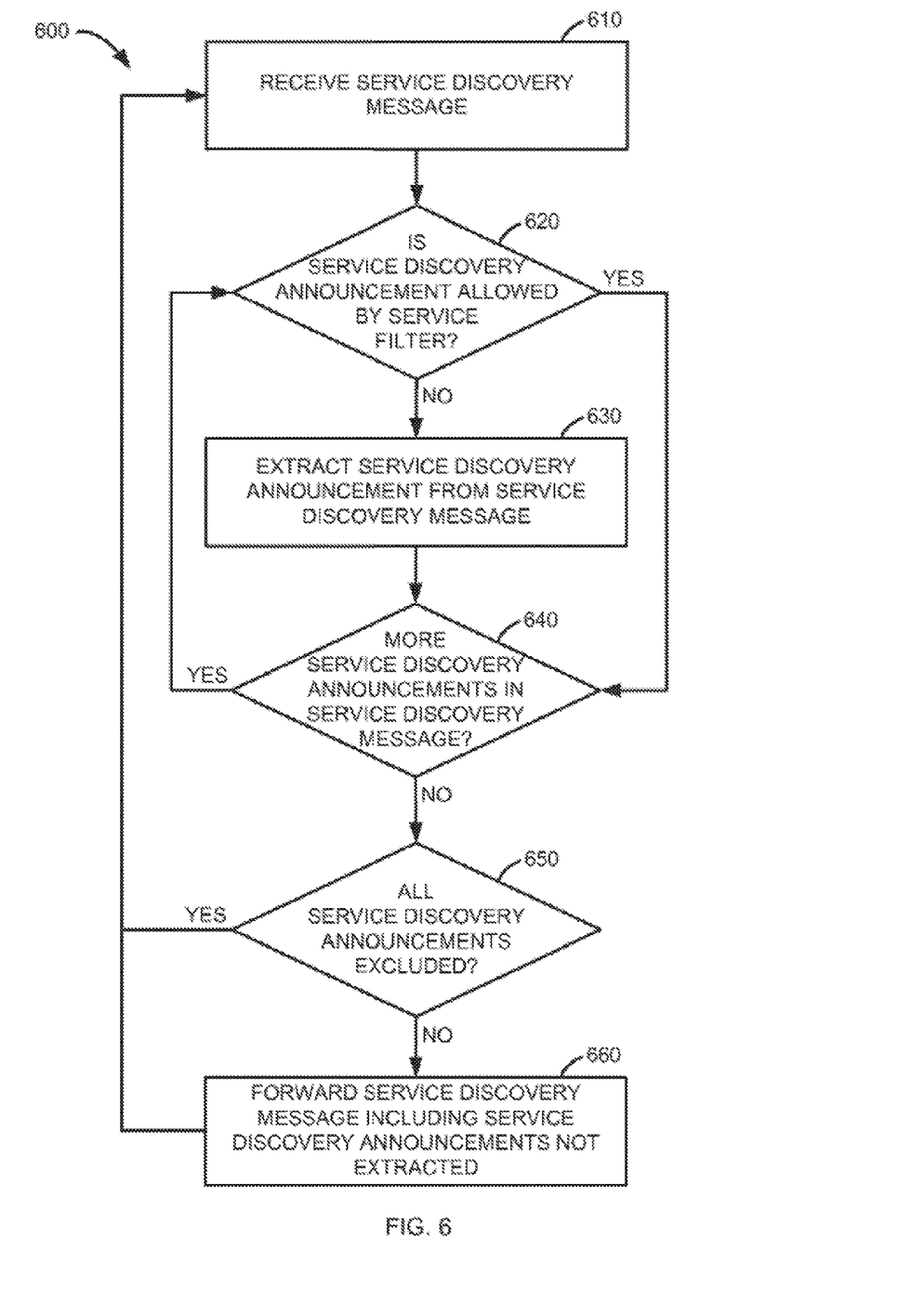
FIG. 6 is a flowchart of a service discovery management process, according to an implementation.

FIG. 6 is a flowchart of a service discovery management process, according to an implementation. Service discovery management process 600 can be implemented or realized at a variety of hosts. For example, process 600 can be implemented at an access point within a network. Additionally, functionalities or actions described herein as being performed by process 600 should be understood to be performed by a host (e.g., an access point) or service discovery management system implementing process 600.

A service discovery message is received at block 610, and process 600 determines at block 620 whether a service discovery announcement included within that service discovery message is allowed by a service filter. For example, a service filter can be selected and applied to the service discovery announcement at block 620. A service filter can be selected using a variety of methodologies and based on a variety of criteria. For example, a service filter can be selected based on a source of a service discovery announcement (e.g., an identifier of a computing system, a service or type or class of service, or a user of a computing system from which the service discovery announcement was provided); a destination of a service discovery announcement (e.g., an identifier of a computing system, a service or type or class of service, or a user of a computing system to which the service discovery announcement is to be provided); a network, network segment virtual network, or other portion of a network; an access point or wireless local area network; a type or class of communications interface (e.g., a wired communications interface or a wireless communications interface) via which a client is connected to an access point, and/or some other criteria or a combination thereof.

If the service discovery announcement is allowed by the selected service filter, process 600 proceeds to block 640. If the service discovery announcement is not allowed by the selected service filter, process 600 proceeds to block 630 at which the service discovery announcement is extracted from the service discovery message. For example, the service discovery announcement can be deleted from the service discovery message. As another example, the service discovery announcement can be added to a list of service discovery announcements that should be deleted later from the service discovery message or not included in a copy of the service discovery message that will be forwarded. Process 600 then proceeds to block 640.

At block 640, process 600 determines whether there are additional service discovery announcements within the service discovery message. If additional service discovery announcements are included within the service discovery message, process 600 proceeds to block 620, and another service discovery announcement is considered or handled. If the service discovery message does not include additional service discovery announcements at block 640, process 600 proceeds to block 650.

Process 600 determines whether all the service discovery announcements within the service discovery message were extracted at block 630. If all the service discovery announcements within the service discovery message were extracted, process 600 returns to block 610 to handle or process another service discovery message. In other words, all the service discovery announcements within the service discovery message have been drooped. However, if one or more service discovery announcements within the service discovery message were not extracted, process 600 proceeds to block 660 at which the service discovery message that includes the service discovery announcements that were not extracted at block 630 is forwarded. That is, a service discovery message including service discovery announcements that were not extracted and not including service discovery announcements that were extracted or dropped is forwarded within a network. Process 600 then proceeds to block 610.

Process 600 illustrated in FIG. 6 is en example implementation of a service discovery management process. In other implementations, a service discovery management process can include additional, fewer, or rearranged blocks or steps. For example, in some implementations, blocks of a service advertisement caching process can be implemented in parallel for multiple service discovery messages. As another example, in some implementations as discussed above, service discovery announcements can be excluded from a service discovery message just prior to or together with forwarding other service discovery announcements within a service discovery message.

Figure 7:
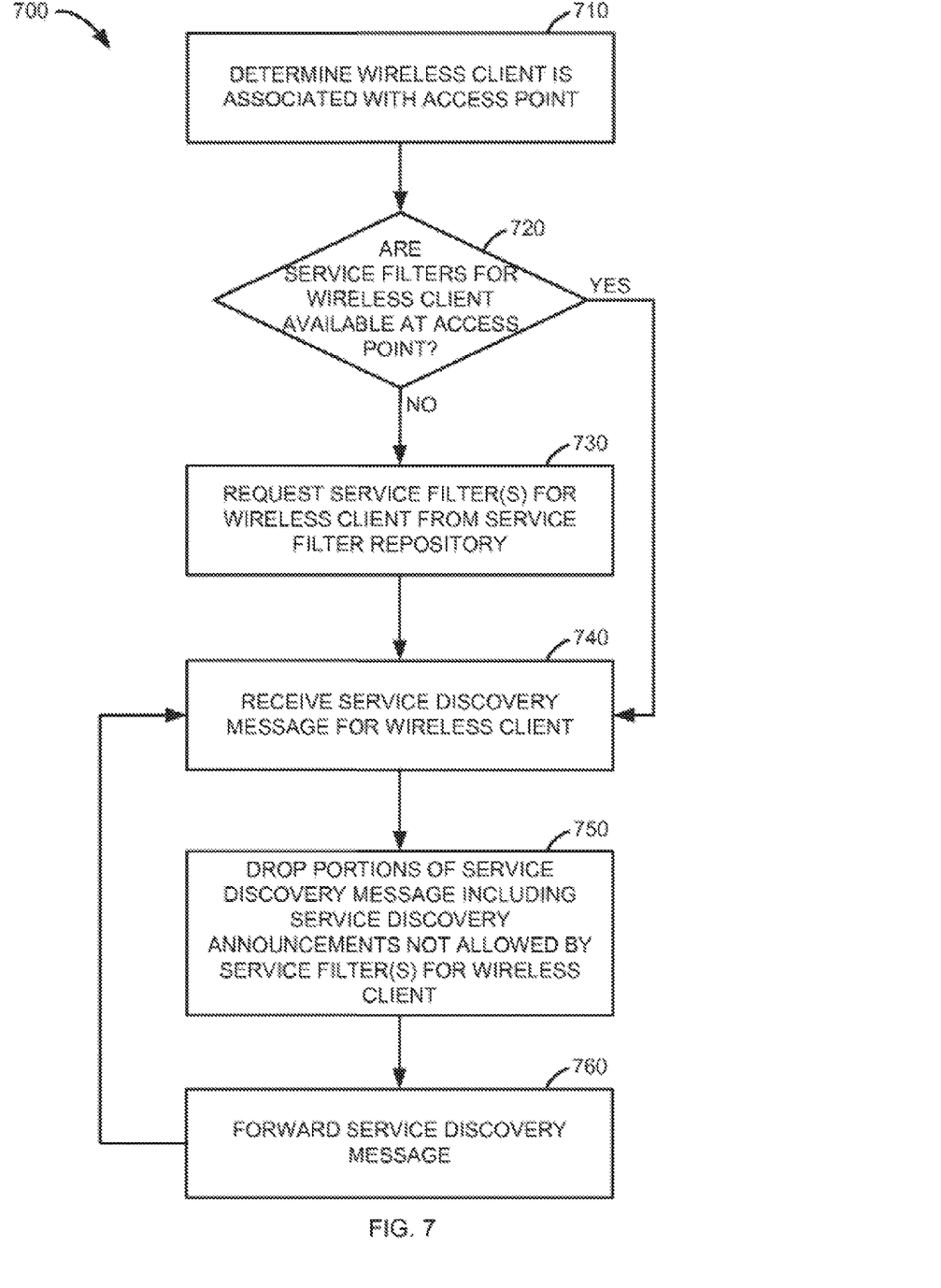
FIG. 7 is a flowchart of another service discovery management process, according to an implementation.

FIG. 7 is a flowchart of another service discovery management process, according to an implementation. More specifically, process 700 illustrates an example process to access service filters. Service discovery management process 700 can be implemented or realized at a variety of hosts. For example, process 700 can be implemented at an access point within a network. Additionally, functionalities or actions described herein as being performed by process 700 should be understood to be performed by a host (e.g., an access point) or service discovery management system implementing process 700.

Process 700 determines that a wireless client (e.g., a computing system communicating with an access point implementing process 700 via a wireless communications interface) is associated with an access point at block 710. For example, an access point can provide a signal to process 700 in response to completion of an association process with the wireless client. Process 700 then determines whether a service filter or service filters for (or corresponding to) that wireless client are available at the access point at block 720. In other words, process 700 determines at block 720 whether the access point has already received service filters for that wireless client.

If a service filter or service filters for that wireless client are not available at the access point, process 700 proceeds to block 730 to request or access those service filters from a service filter repository. Process 700 then proceeds to blocks 740, 750, and 760 to apply these service filters to service discovery announcements within service discovery messages for that wireless client. Similarly, if a service filter or service filters for that wireless client are available at the access point, process 700 proceeds to block 740.

At block 740, a service discovery message for the wireless client is received. A service discovery message can be said to be for a wireless client (e.g., a computing system, a service, or an application communicating with an access point via a wireless interface) if that service discovery message is provided from or is directed to that wireless client (e.g., addressed to a unicast address, a broadcast address, or a multicast address with which that wireless client is associated). A service filter (or multiple service filters) for the wireless client is then applied to the service discovery announcements in that service discovery message.

Portions of the service discovery message including service discovery announcements that are not allowed by the service filter or service filters for the wireless client applied to the service discovery announcements are dropped at block 750, for example as discussed above. The service discovery message excluding portions that include service discovery announcements that are not allowed by the service filter or service filters for the wireless client is then forwarded at block 760.

Process 700 illustrated in FIG. 7 is an example implementation of a service discovery management process. In other implementations, a service discovery management process can include additional, fewer, or rearranged blocks or steps. For example, in another implementation, process 700 can also determine whether additional service filters for a wireless client are available at a service filter repository and request those service filters. As a specific example, an access point implementing process 700 can communicate with a service filter repository in response to determining that a wireless client is associated with the access point to determine whether additional or updated service filters are available for that wireless client. The access point can then request or access such additional or updated service filters.

As used herein, the term "module" refers to a combination of hardware (e.g., a processor such as an integrated circuit or other circuitry) and software (e.g., programming such as machine- or processor-executable instructions, commands, or code such as firmware, programming, or object code). A combination of hardware and software includes hardware only (i.e., a hardware element with no software elements such as an ASIC), software hosted at hardware (e.g., software that is stored at a processor-readable memory such as RAM, a hard-disk or solid-state drive, resistive memory, or optical media such as a DVD and/or executed or interpreted at a processor), or hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanisms (e.g., sending data to a computing system or agent via a communications path or channel), pull mechanisms (e.g., delivering data to a computing system or agent in response to a request from the computing system or agent), and store mechanisms (e.g., storing data at a data store or service at which a computing system or agent can access the data). Furthermore, as used herein, the term "based on" means "based at least in part on." Thus, a feature that is described as based on some cause, can be based only on the cause, or based on that cause and on one or more other causes.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or components can be included at different modules, engines, or components in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

What is claimed is:

1. An access point, comprising:
a processor; and
a memory resource storing machine-readable instructions to cause the processor to:
identify a plurality of service discovery announcements within a service discovery message;
compare the plurality of service discovery announcements to a plurality of service filters in an order defined by a priority assigned to the plurality of service filters;
determine whether the plurality of service discovery announcements is allowed based on a corresponding first-ordered service filter of the plurality of service filters;
extract from the service discovery message a service discovery announcement of the plurality of service discovery announcements that is not allowed; and
forward a remaining portion of the service discovery message to a computing device if at least one service discovery announcement of the plurality of service discovery announcements is allowed.

2. The access point of claim 1, wherein:
the plurality of service discovery announcements includes a first service discovery announcement and a second service discovery announcement;
the first service discovery announcement is allowed and the second service discovery announcement is not allowed; and
the forwarded portion of the service discovery message includes the first service discovery announcement but does not include the second service discovery announcement.

3. The access point of claim 1, the memory resource storing the machine-readable instructions to cause the processor to:
request the plurality of service filters at a service filter repository and store the plurality of service filters within the memory resource of the access point.

4. The access point of claim 1, the memory resource storing the machine-readable instructions to cause the processor to:
determine that a wireless client has associated with the access point and request a service filter associated with that wireless client at a service filter repository in response to the determination that the wireless client has associated with the access point.

5. The access point of claim 1, wherein the first-ordered service filter is a highest priority service filter of the plurality of service filters satisfied by the service discovery announcement of the plurality of service discovery announcements.

6. The access point of claim 1, the memory resource storing the machine-readable instructions to cause the processor to drop the extracted service discovery announcement from the service discovery announcement.

7. A service discovery management system, comprising:
a processor; and
a memory resource storing machine-readable instructions to cause the processor to:
identify a first service discovery announcement and a second service discovery announcement within a service discovery message;
compare the first service discovery announcement and the second service discovery announcement to a plurality of service filters in an order defined by a priority assigned to the plurality of service filters;
determine that the first service discovery announcement is not allowed by a corresponding first-ordered service filter of the plurality of service filters satisfied by the first service discovery announcement and that the second service discovery announcement is allowed by a corresponding first-ordered service filter of the plurality of service filters satisfied by the second service discovery announcement; and extract the first service discovery announcement from the service discovery message and then forward the service discovery message, including the second service discovery announcement, to a computing device.

8. The system of claim 7, further comprising:
a wired communications interface; and
a wireless communication interface,
wherein the the service discovery message is received via the wired communications interface, and
wherein the service discovery message including the second service discovery announcement is forwarded to a wireless client via the wireless communications interface.

9. The system of claim 7, further comprising:
a wired communications interface; and
a wireless communication interface,
wherein the service discovery message is received via the wireless communications interface, and
wherein the service discovery message including the second service discovery announcement is forwarded to a wireless client via the wired communications interface.

10. The system of claim 7, further comprising:
a wired communications interface; and
a wireless communication interface,
wherein the corresponding first-ordered service filter of the plurality of service filters satisfied by the second service discovery announcement is associated with a user of a wireless client communicating via the wireless communications interface,
the service discovery message is received via the wired communications interface, and
the service discovery message including the second service discovery announcement is forwarded to the wireless client via the wireless communications interface.

11. The system of claim 7, further comprising:
a wired communications interface; and
a wireless communication interface,
wherein the corresponding first-ordered service filter of the plurality of service filters satisfied by the second service discovery announcement is associated with a user of a wireless client communicating via the wireless communications interface,
the service discovery message is received via the wireless communications interface, and
the service discovery message including the second service discovery announcement is forwarded to the wireless client via the wired communications interface.

12. A non-transitory machine-readable medium having stored thereon machine-readable instructions to cause a computing-processor to:
compare a plurality of service discovery announcements included in a service discovery message to a plurality of service filters in an order defined by a priority assigned to the plurality of service filters;
determine whether the plurality of service discovery announcements is allowed by a corresponding satisfied first-ordered service filter of the plurality of service filters;
extract from the service discovery message a service discovery announcement from the plurality of service discovery announcements that is not allowed; and
forward the service discovery message if at least one service discovery announcement from the plurality of service discovery announcements was not extracted from the service discovery message.

13. The non-transitory machine-readable medium of claim 12, having stored thereon the machine-readable instructions to cause the computing-processor to:
drop the service discovery message if the plurality of service discovery announcements is not allowed.

14. The non-transitory machine-readable medium of claim 12, wherein:
the service discovery message is received via a wireless communications interface of an access point; and
the service discovery message is forwarded via a wired communications interface of the access point.

15. The non-transitory machine-readable medium of claim 12, wherein:
the service discovery message is received via a wired communications interface of an access point; and
the service discovery message is forwarded via a wireless communications interface of the access point.

16. The non-transitory machine-readable medium of claim 12, having stored thereon the machine-readable instructions to cause the computing-processor to:
request, from a service filter repository, the plurality of service filters corresponding to the plurality of service discovery announcements included in the service discovery message.

17. The non-transitory machine-readable medium of claim 12, having stored thereon the machine-readable instructions to cause the computing-processor to extract the service discovery announcement from the plurality of service discovery announcements by generating a copy of the service discovery message that does not include the extracted service discovery announcement.

18. The non-transitory machine-readable medium of claim 17, having stored thereon the machine-readable instructions to cause the computing-processor to forward the service discovery message by forwarding the copy of the service discovery message.

19. The non-transitory machine-readable medium of claim 12, having stored thereon the machine-readable instructions to cause the computing-processor to determine whether the plurality of service discovery announcements is allowed by the plurality of service filters satisfied by the service discovery announcement including the corresponding satisfied first-ordered service filter.

* * * * *